No. 614,207. Patented Nov. 15, 1898.
W. E. M. JACKSON.
TELEPHONE EXCHANGE SYSTEM.
(Application filed Jan. 14, 1896.)
(No Model.)
5 Sheets—Sheet 1.
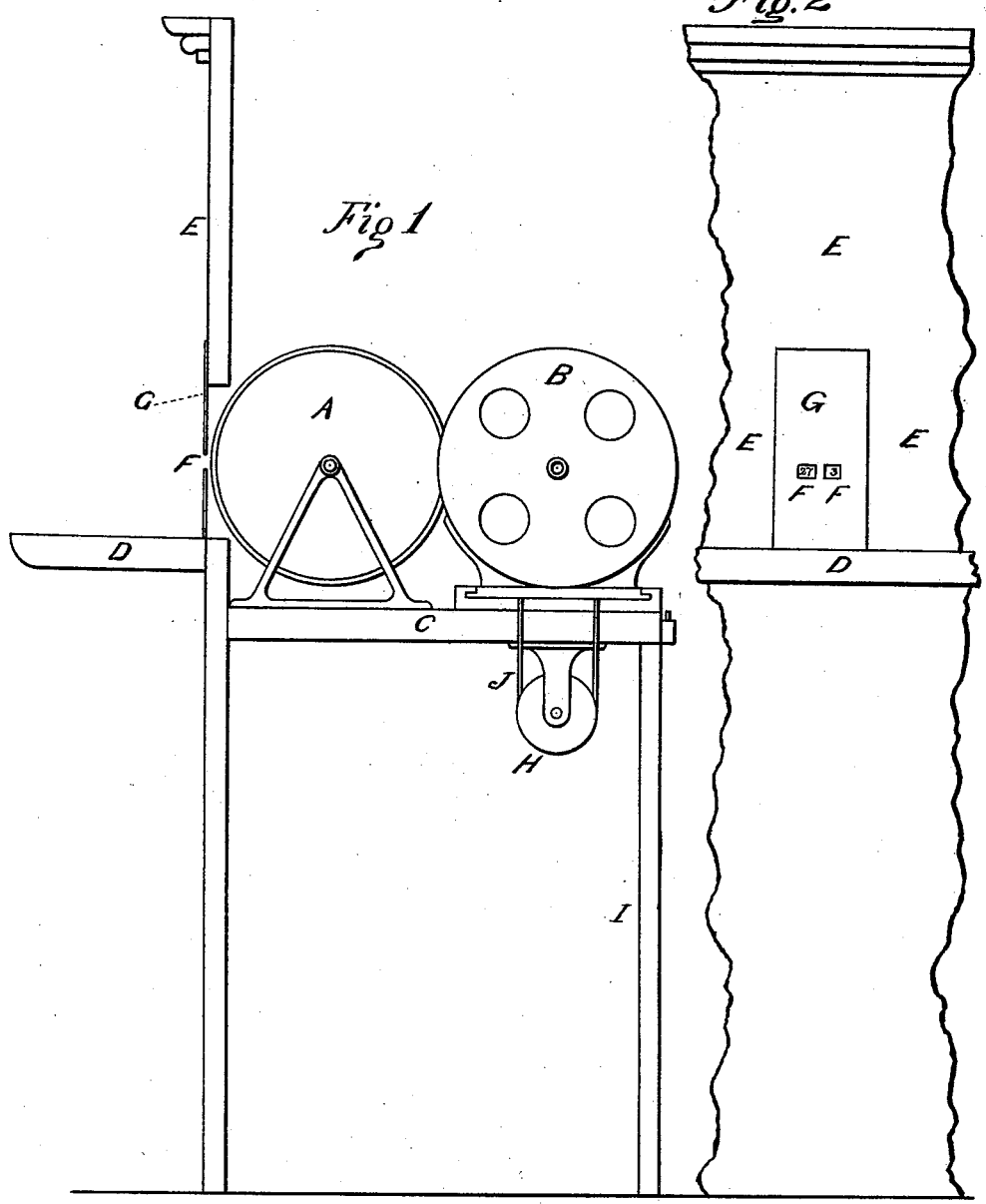
Witnesses:
Sue Belle Mead
Henry O. Jackson
Inventor:
William E. M. Jackson No. 614,207. Patented Nov. 15, 1898.
W. E. M. JACKSON.
TELEPHONE EXCHANGE SYSTEM.
(Application filed Jan. 14, 1896.)
(No Model.) 5 Sheets—Sheet 2.
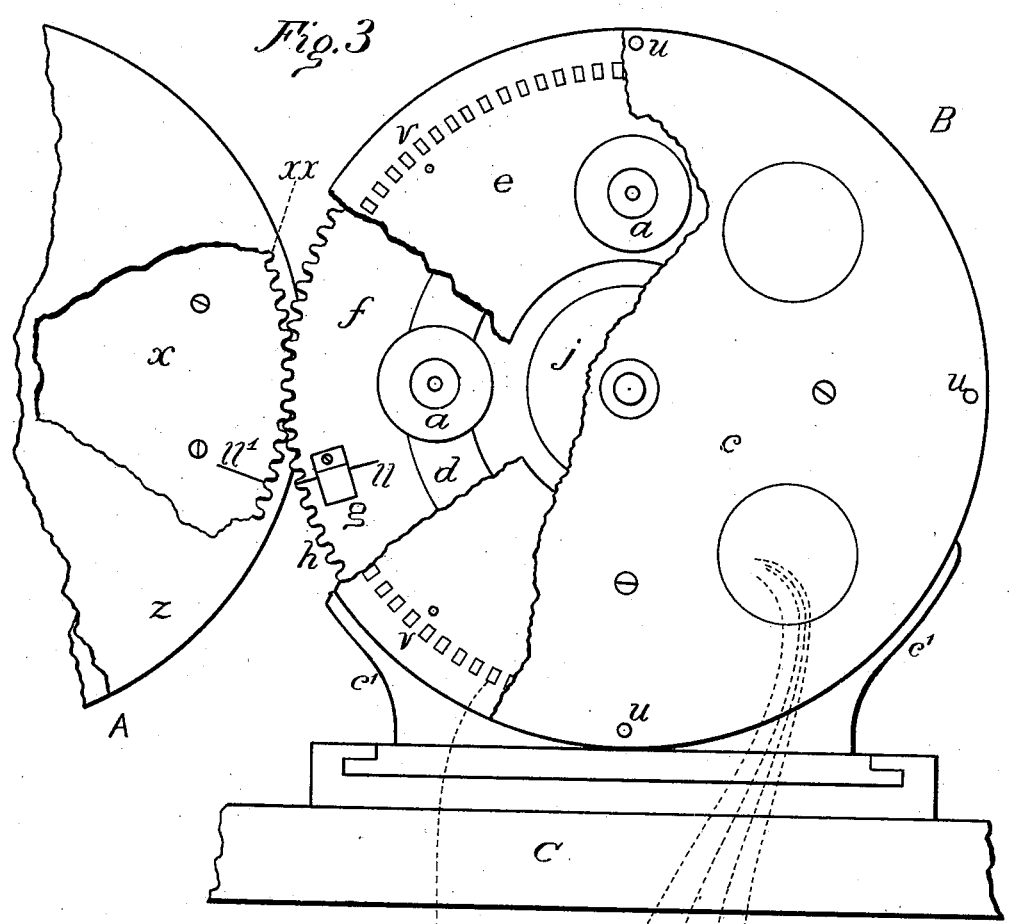
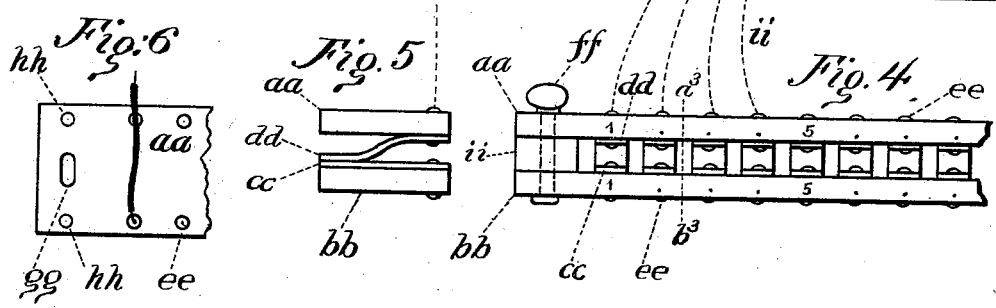
Witnesses: Inventor:
William E. M. Jackson No. 614,207. Patented Nov. 15, 1898.
W. E. M. JACKSON.
TELEPHONE EXCHANGE SYSTEM.
(Application filed Jan. 14, 1896.)
(No Model.) 5 Sheets—Sheet 3.
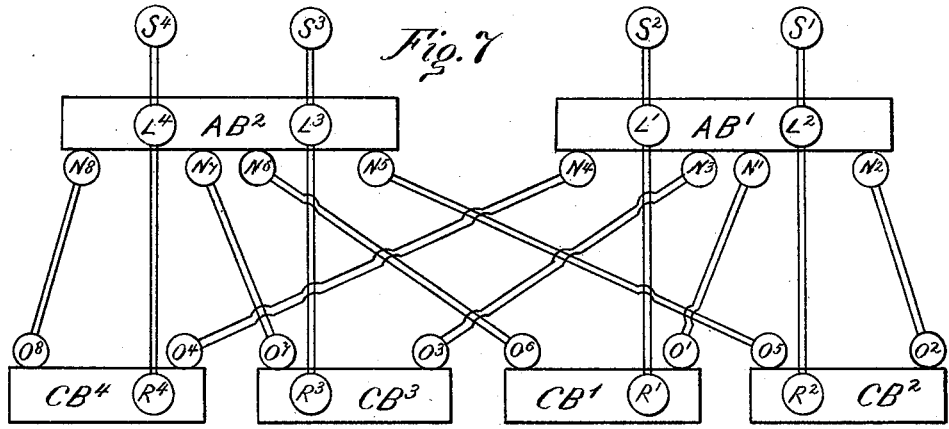
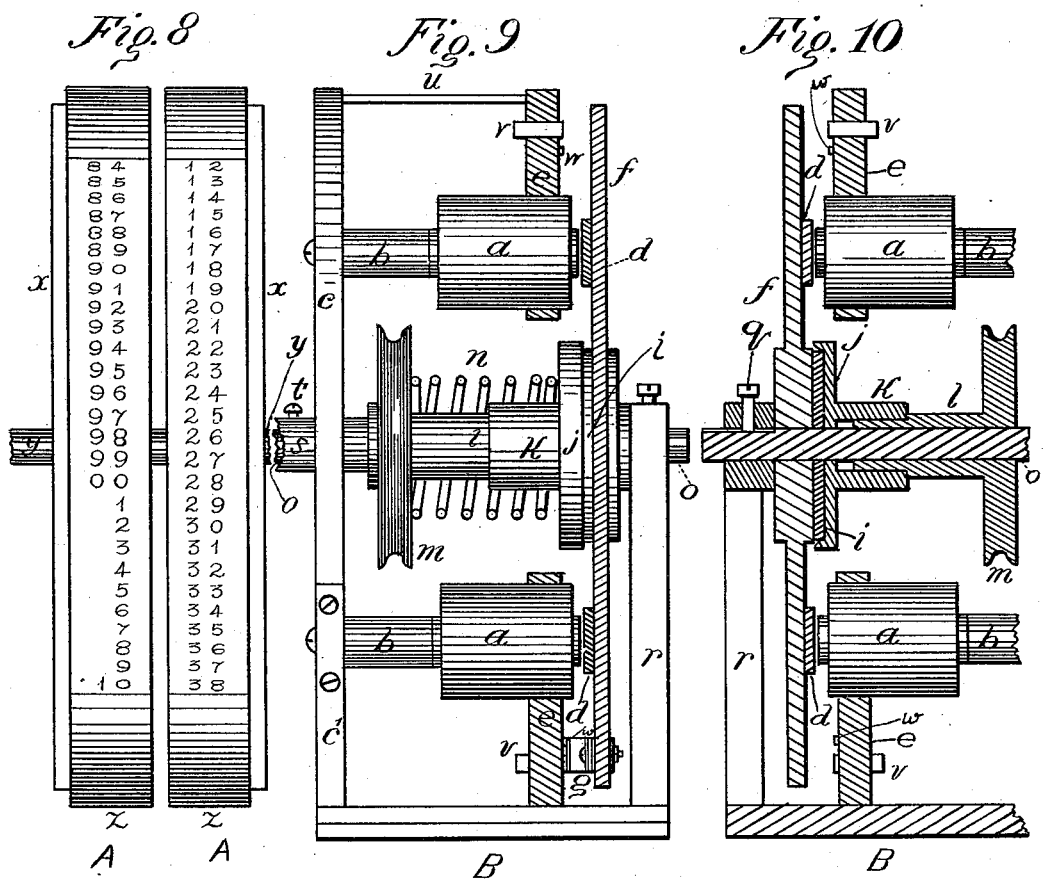
Witnesses: Inventor:
William E. M. Jackson No. 614,207. Patented Nov. 15, 1898.
W. E. M. JACKSON.
TELEPHONE EXCHANGE SYSTEM.
(Application filed Jan. 14, 1896.)
(No Model.) 5 Sheets—Sheet 4.
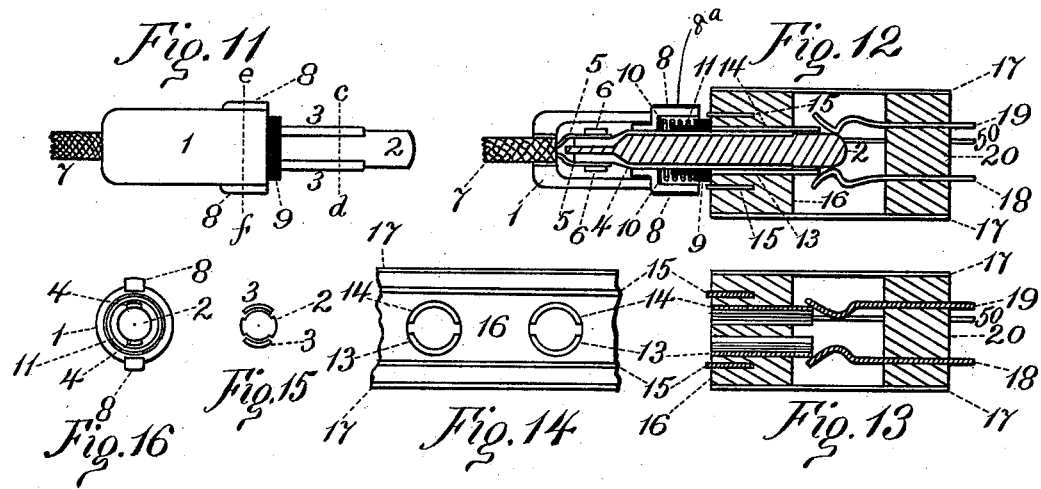
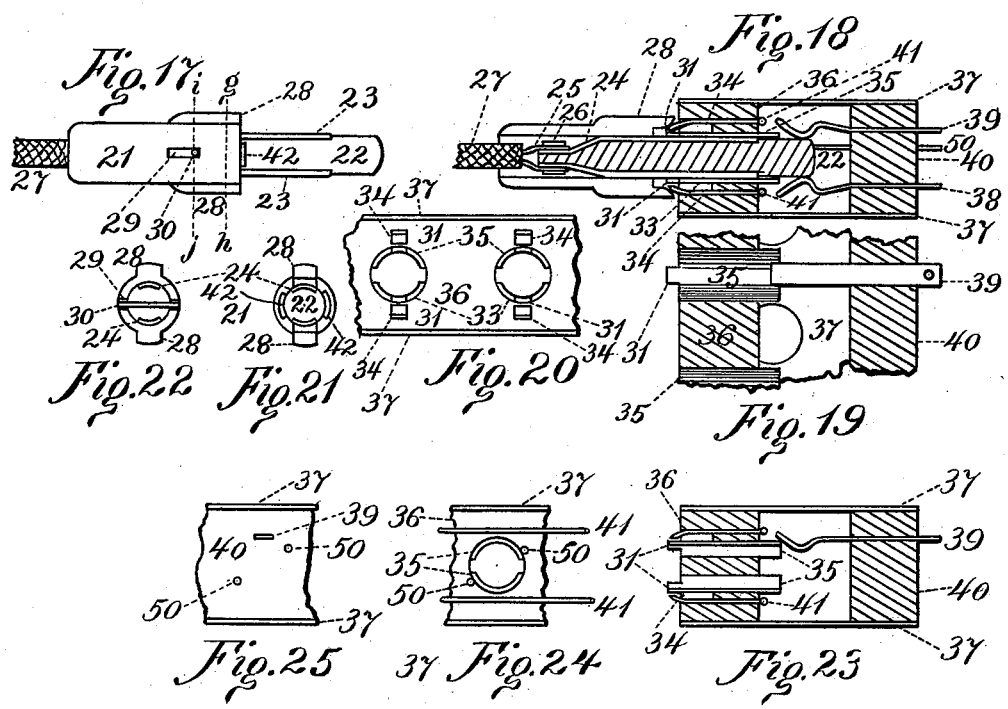
Witnesses:
Inventor:
William E. M. Jackson

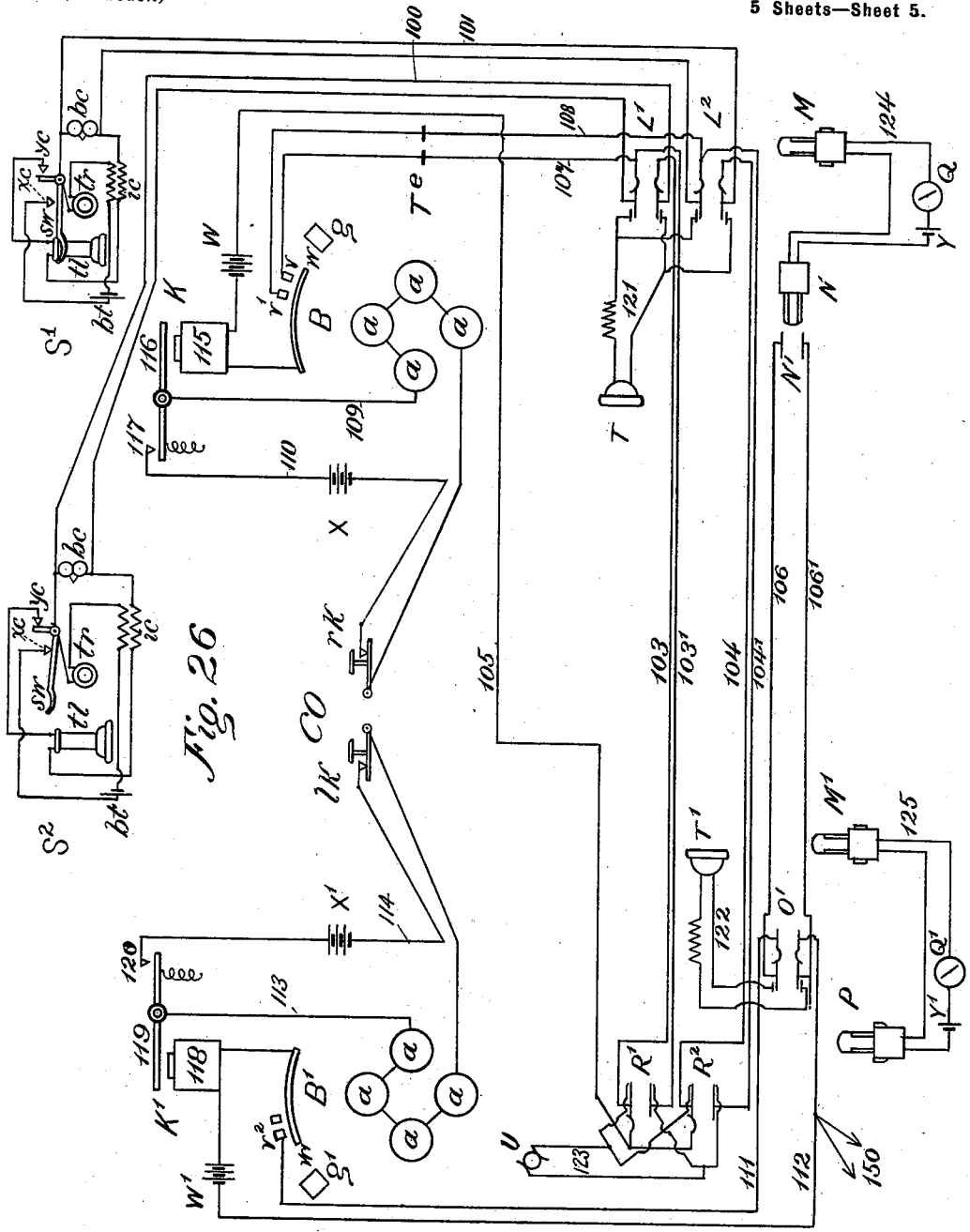

UNITED STATES PATENT OFFICE.

WILLIAM E. M. JACKSON, OF CHICAGO, ILLINOIS.

TELEPHONE-EXCHANGE SYSTEM.

SPECIFICATION forming part of Letters Patent No. 614,207, dated November 15, 1898.

Application filed January 14, 1896. Serial No. 575,537. (No model.)

*To all whom it may concern:*

Be it known that I, WILLIAM E. M. JACKSON, residing at Chicago, in the county of Cook and State of Illinois, have invented certain new and useful Improvements in Telephone-Exchange Systems, of which the following is a specification.

In telephony experience has taught that the following are desiderata: in the service, few and simple motions upon the part of the subscriber in calling the exchange either to obtain a connection, to ring off when through talking, or to call the attention of the operator during a connection and upon the part of the operator in answering a call, disconnecting or listening in on a connection, promptness in first answering a calling subscriber, and accuracy and speed in making the connections; in the apparatus, simplicity and reliability, accessibility for remedying defects or making repairs or alterations, and compactness of the parts to be reached or used by the operators. It is the purpose of my invention to fulfil more of these conditions than are at present served by the apparatus commonly used, and it is in the main an application of the system of electrical signaling apparatus for which Letters Patent were granted to me March 26, 1895, No. 536,210, for telephone-exchange switching apparatus, in combination with novel arrangements of plugs and spring-jacks and listening, ringing, and calling devices. While I have herein shown the apparatus as specially arranged for what is known as a "transfer system," the special devices and the signaling device are equally applicable to a multiple system in whole or part.

At the exchange I use signal-wheels, one wheel for a large number of lines—say one hundred—connected with and controlled by a non-interfering selective device. The space necessary to reserve on a section of switchboard for the display of a character on the face of this signal-wheel is very small compared with that taken by one hundred of the annunciators commonly used, and all characters upon the wheel can be displayed in succession in this space. These signal-wheels are normally revolving, and a subscriber calling causes his number to stop in front of an aperture anterior to the signal-wheel containing said number, the motion of the wheel being arrested until the operator inserts the answering-plug in his spring-jack. Other subscribers whose numbers are on the same signal-wheel cannot call the attention of the operator until this first one's call has been answered. An operator will thus have but one call to demand her attention and but one thing to do at a time, and consequently will not become confused.

As commonly arranged at present a switchboard is equipped with ten pairs of plugs and cords for each operator, and in connection with each pair of cords a listening-in device, a ring-off annunciator, and two ringing-buttons. As operated such a switch-board requires, first, the insertion of a plug in the jack of the calling subscriber; second, throwing the lever of the listening-in device; third, insertion of the other plug of the pair in the jack of the called subscriber; fourth, pressing a ringing-button, and, fifth, restoring the annunciator of the calling subscriber. (The fifth operation is dispensed with when self-restoring annunciators are used; but they are expensive and not as yet widely adopted.) The insertion of the plugs is generally made upon the vertical portion of the board, while the listening-in cam and ringing-buttons are on the shelf thereof, a considerable space sometimes intervening between the locations, so that an operator cannot always use both hands at the same time. In the system herein described I do not use separate listening and ringing devices located upon the keyboard or shelf, but carry the circuit from the operator's telephone to terminals close to the line-terminals of the jacks and likewise the circuit from the ringing-current generator, having one plug (the answering-plug) arranged to cross the line-terminals with the operator's circuit by a simple operation of the operator's fingers while inserting same, and another plug by a similar operation to cross the line-terminals upon which it is desired to signal with the ringing-circuit. The release of the operator's hold upon the plugs restores the circuit as a simple connection. In making a connection with this system, therefore, but two operations are necessary upon the operator's part. First, she inserts the answering-plug in the calling-subscriber's jack and by the pressure of her fingers while doing so throws her telephone-circuit in and takes his order, and, second, she inserts the ringing or connecting plug in the jack of the called subscriber and in a similar manner signals him. I have taken in these illustrations the case of a simple board or that of a multiple board. In the case of a transfer-board the operations necessary in each instance will of course be increased; but the comparison will still hold good.

In the old systems the listening and ringing devices being set in the shelf are rather difficult of access for repairs, and even when the shelf is made to lift in sections to allow a repairman to gain quicker access to the parts it is necessary for him in doing so to occupy space which is required for the operators in order that they may move about readily in making connections.

By having the parts which are likely to need repairs in connection with the listening and ringing devices located upon the plugs I make it easy for the repairman to remedy defects or make changes quickly and without interfering with the operators, as while doing so he can stand behind an operator after drawing out the plug attached to its cord. I have also provided for the quick changing of a selective device when deranged, or if but one line or its connections are out of order for the cutting out of that line, so as not to interfere with the others connected to the same apparatus. A simple terminal for the lines connected to each selective device is provided, whereby all such lines may be disconnected and then reconnected to a new selective device speedily. The selective device and its terminals are much more accessible than the annunciators commonly used, less disturbance is given the wires when making changes or remedying trouble, and fewer working parts to the number of lines are involved.

In operating my apparatus as a transfer switching system I have originated the following plan: The exchange will contain two distinct switchboards—one, called the "answering-board," where the subscriber's signal will first be received, but where it is designed to make no connections except upon trunk-lines, and the other, called the "connecting-board," where the connections called for are made, the two boards being connected by necessary trunk-lines. In large exchanges where branch offices are used it is customary to have a character or word prefix the telephone-number to indicate to the operator in which branch office the line called for is located. Two systems of transfers have been used—one in which the answering operator makes connection on a trunk-line to the board upon which the called line is located, actuating a signal thereon, the operator upon the second board then again answering the subscriber upon the trunk and requiring him to repeat the call, and the other in which the answering operator repeats the number to the second operator, thereby entailing upon her considerable extra work. In my system, the numbers being arranged in hundreds, each hundred has prefixed a distinguishing letter or word, preferably the former. The answering-board can be one continuous board, where one operator can answer many more subscribers than usual. The connecting-boards can be separate, all in the same room or in different branch offices; but each one of these boards will carry but a limited number of lines—say one hundred—and each will be designated by a letter. Subscriber $A^{23}$ will have a line to A connecting-board and subscriber $X^{32}$ to X connecting-board, all lines being connected to the answering-board, divided up among the operators there stationed. Each answering-board operator will have trunk-lines to each connecting-board.

The operation will be as follows: Subscriber $A^{23}$ calls, desiring connection with $F^{37}$, the signal being received by answering-board operator B, who will say, "Letter?" Subscriber will answer, "F." Operator B will connect his line to a trunk-line to connecting-board F, and operator C, stationed thereon, receiving a signal on this trunk, will answer thereon, saying, "Number?" Subscriber will answer, "37," and operator C will complete the connection to this line, which is located on her board. Operator B will have no repeating over trunk-lines to do and can answer all subscribers promptly, while the subscriber also does not have to repeat, but simply divides his order.

In the accompanying drawings, Figure 1 gives an outline view of a vertical section of a switchboard with the signal-receiving apparatus applied thereto. Fig. 2 is a front view of part of a section of switchboard, showing the space necessary to reserve for the signal-receiver. Fig. 3 is a side view, broken away in parts, of the signal-receiver. Fig. 4 is a top view of a special terminal strip. Fig. 5 is a section through line $a^3 b^3$ of the terminal strip. Fig. 6 is a top view of part of the terminal strip. Fig. 7 shows, diagrammatically, the relative arrangement of switchboards and lines. Fig. 8 shows two signal-wheels in relative position. Fig. 9 is a side view of the signal-selective device, partly in section. Fig. 10 is a side view of parts of the selective device, more in section. Fig. 11 is a view of the answering-plug. Fig. 12 is a sectional view of same plug and of the answering spring-jack. Fig. 13 is a section of the spring-jack without the plug inserted. Fig. 14 is a front view of two spring-jacks. Fig. 15 is a section of the plug through the line $c\,d$ in Fig. 11. Fig. 16 is a section of the plug through the line $e\,f$ in Fig. 11. Fig. 17 is a view of the calling or connecting plug. Fig. 18 is a sectional view of a connecting-plug and a spring-jack. Fig. 19 is a horizontal section of a jack. Fig. 20 is a front view of two of same jacks. Fig. 21 is a sectional view of the plug through the line $g\,h$, Fig. 17. Fig. 22 is a section of the plug through the line $i\,j$, Fig. 17. Fig. 23 is a section of a connecting-jack with but one spring. Fig. 24 is the back of the front plate 36 of the spring-jack. Fig. 25 is the back of the back plate 40 of the spring-jack. Fig. 26 is a diagram of the circuits of the system arranged for transfers.

I will first describe, briefly, the signal-receiving apparatus, reference being made in this regard to Letters Patent No. 536,210.

The shaft $o$ has riding freely thereon the pulley $m$ and also carries freely the wheel $f$. Attached to $f$ is the friction-disk $i$, made preferably of leather, and impinging upon $i$ is the disk $j$, to which is rigidly attached the thimble $k$, which is feathered to another thimble $l$, attached to the pulley $m$ and riding with it upon the shaft. A thimble-piece $s$ is attached adjustably to the shaft by a set-screw $t$ and bears with a broad end against the pulley. The opposite side of the wheel $f$ bears against the end of a supporting-standard $r$, through which the shaft $o$ passes, being held adjustably by the set-screw $q$. Between $j$ and the inner surface of $m$ a compressed spring $n$ is placed. When the pulley $m$ is turned on account of the spring $n$ keeping $j$ pressed close to the friction-disk $i$, the wheel $f$ will also turn in unison. If, however, a brake is put on $f$, it will easily be held while the other parts $j$, $k$, $l$, and $m$ continue to revolve. The brake which I prefer to use consists of four electromagnets $a$ $a$ $a$ $a$, rigidly held, with poles close to a ring-armature $d$ upon the wheel $f$. These magnets being quite powerful and with poles very close to the armature will when energized instantly arrest the motion of the wheel $f$ and hold it until deënergized. A piece $b$ connects the core of each magnet to the frame-piece $c$, $b$ and $c$ being made of iron to complete the magnetic circuit.

An insulating-plate $e$ is held by the bolts $u$ and attachments to the magnets and the framework close to the inner face of $f$ and has embedded in it the terminal pieces $v$ and terminal ring $w$. Attached to the wheel $f$, but insulated from it, is the contact-maker $g$, directly opposite the ring $w$ and the circle of terminal pieces $v$ and making contact therewith. This contact-maker will always make contact with $w$, but only with one terminal piece at a time, crossing that piece with $w$. If, therefore, a circuit through the electromagnets is made to terminate at $w$ and one terminal piece $v$ and the pulley then revolved the wheel $f$ will revolve with it until $g$ crosses $v$ and $w$, closing the circuit, actuating the magnets, and arresting the motion of $f$ until the circuit is broken, when $f$ will again revolve.

For accessibility I do not herein make the wheel $f$ the direct instrument of displaying the signals, as in my Patent No. 536,210, but prefer to gear the same to a separate display-wheel A, as shown in Fig. 3, using toothed gearing for synchronous motion, the gear-wheel $x$ of A being of same size as $f$. The face of the display-wheel $z$ is covered with the characters to be displayed, as shown in Fig. 8. For compactness I prefer to place two of the selective devices B B side by side, with their wheels $ff$ facing, and also to mount two display devices A A side by side and in front of B B. This relative arrangement of the selective device and display-wheel is shown in Fig. 1, while in Fig. 2 the two numbers "27" and "3" on the two display-wheels back of the board appear through openings F F in plate G, which plate represents the whole space which it is necessary to reserve on the front of the switchboard for the signaling apparatus with this arrangement, the balance of space E E E being available for spring-jacks—a decided advantage in a multiple switchboard where many jacks are required within a compass accessible to one operator. A heavy shelf C, supported by the standard I and the frame of the switchboard, forms a base upon which A and B are mounted. A driving-pulley H is mounted underneath this shelf and connected by a pulley-cord J with the pulley $m$ of the selective device. Preferably a pulley for each selective device is furnished, but these can be driven by one power device. (Not indicated in the drawings, as many well-known sources of rotary power can be used.) The ordinary cord-shelf D of the switchboard is shown in relative position with other parts.

I will now describe the spring-jacks and plugs. Ordinarily it is only necessary for the operator to listen to a subscriber upon the plug inserted to answer a call and only requisite to ring the subscriber called for. The first jack and plug used will be called the "answering-jack" and "answering-plug," and the others, making final connection, the "connecting-jack" and "connecting-plug." Referring to Figs. 12, 13, and 14, representing a form of answering-jack, the line-terminals 13 and 14 are of the form which would result by cutting a piece of metal tube lengthwise with a broad saw-cut; preferably, however, they would be stamped out. The two sections of tubing are secured in the round hole in the insulating-block 16, one over the other and thus insulated from each other. The front edges will be flush with the face of 16, while the rear edges will be carried beyond the back of 16. Another insulating-block 20 will have inserted in it the contact-springs 18 and 19, which are preferably flat strips of metal stamped at one end into a half-hook shape. The hooked ends of these contact-springs normally rest upon the rear ends of the line-terminals. The blocks 16 and 20, with a number of these terminals and springs forming the jacks inserted therein, are held together by the strips 17. Inserted in the front part of 16 are the metal strips 15, one above and one below close to the line-terminals, as best seen in Fig. 14, and continuing along the whole row of jacks. These are the listening-strips. All the top strips will be connected together and to one side of the operator's telephone-circuit, and all the lower strips also connected together and to the other side of the operator's circuit throughout the entire section of switchboard which this one operator will answer. Several sections can be connected together by simple cut in and out devices, as obvious. The answering-plug used, as shown in Figs. 11, 12, 15, and 16, has an insulating-stem 2, with upper and lower contact-pieces 3, connected with the conductors in the cord 7. The contact-pieces do not extend to the end of 2, so that when the plug is inserted in a jack the insulating end will impinge upon the bellies of the hooked ends of 18 and 19, raising these contact-springs out of contact with 13 and 14 and insulating them from all other parts of the jack or plug, as shown in Fig. 12. At the same time the contact-pieces 3 will fit closely against the line-terminals 13 and 14 and connection thus made with these terminals and the conducting-strands of the cord. The stem 2 can be cut away somewhat under the pieces 3, as shown in Fig. 15, so as to give a spring to these pieces and make the fit closer. The plug-handle has a cover 1, as usual, except that it is cut away at top and bottom toward the front to make room for the extension-pieces 8. These pieces 8 are formed with a footing impinging upon 4, 4 being really the extension of the contact-pieces 3 into the handle of the plug. An insulating-ring 9 is placed around the stem of the plug and firmly secured thereto at a point which limits the insertion in the jack. Against a shoulder on this ring a small spring 11 is placed, the other end of the spring abutting against an insulating-piece 10, resting in a shoulder formed by the angle of 8. Preferably the pieces 8 are covered where they project above 1, for a short distance at least, with insulating material 8$^a$, but the ends facing the end of the plug are always to be left free metal continuous as a conductor to 4. If, while the plug is inserted, as in Fig. 12, the pieces 8 are pushed forward, the ends will make contact with the listening-strips 15, and the footings, sliding upon 4, will keep contact therewith, and a circuit thus established from the line-terminals (connected with the instrument of a subscriber calling) through contact-pieces 3, shoulder-pieces 8, and listening-strips 15 to the operator's-telephone circuit. As the operator inserts the plug she pushes forward the shoulder-pieces 8 to make this circuit, and when the order is received by removing her hold of the plug the spring 11 is allowed to restore the pieces 8 to normal position and break the listening-circuit. At any time afterward she may listen in upon a connection by pressing forward the pieces 8, and if she finds that the parties are through talking she can remove the plug by the same hand used to press the listening device. The ends of the cord strands 5 are secured to the pieces 4 by screws 6 or in any suitable way.

Fig. 15 shows a section of the plug through the line $c\,d$ in Fig. 11, and Fig. 16 is a section through the line $e\,f$ in same figure.

A connecting-jack is shown in Fig. 18 with the connecting-plug inserted. The spring-jack proper is similar to the answering-jack, the terminals 33 and 35 corresponding to 13 and 14, contact-springs 38 and 39 to 18 and 19, insulating-blocks 36 and 40 to 16 and 20, and strips 37 to 17, comparing Figs. 12 and 18. The ringing-springs 34 are inserted, one over 35 and one under 33, the insulating-block 36 being cut away for a short distance from the front between 33 and 35, and these ringing-springs, which are slightly bent inward at the ends, projecting beyond the face of 36. At the back of 36 wires 41 connect the top ringing-springs together and the bottom springs together, and in practice all the upper ringing-springs on a switchboard are connected to one side and all the lower ringing-springs to the other side of a generator-circuit. The terminals 33 and 35 are furnished with extensions 31, projecting beyond the face of 36 and close to the ringing-springs. When, therefore, pressure is exerted over and against the curved ends of the ringing-springs, they will be forced into contact with 33 and 35 and a ringing-current communicated to the circuit connected therewith.

In Fig. 20, which is a face view of two spring-jacks, the relative position of the springs 34 and projections 31 of terminals is more clearly shown.

The ringing-plug is also similar in many respects to the listening-plug, the parts closely corresponding being 2 and 22, 3 and 23, 7 and 27, 4 and 24, 6 and 26, 5 and 25, comparing Figs. 11 and 12 with Figs. 17 and 18. The plug-cover 21 is furnished with upper and lower shoulder-pieces 28, the internal ends being curved away, as shown in section in Fig. 18, and coming against and over the bent ends of the ringing-springs 34. At each side of 21 is an aperture 29, in which projects a pin 30, transfixed through 22. A projection 42 of 22 on each side limits the insertion of the plug in the spring-jack. 21 is movable on the stem of the plug, being, however, limited by the pin 30 in the aperture 29 to a slight forward-and-backward movement. Figs. 21 and 22, being sections of the plug through the lines $g\,h$ and $i\,j$, respectively, show more clearly its construction. The plug being inserted in the jack, as shown in Fig. 18, the operator presses her fingers against the shoulders 28, throwing the cover 21 forward and pressing the curved ends of 28 against the ends of the ringing-springs 34, bringing them in contact with the projections 31 on the terminals 33 and 35, and thus throwing the ringing-current into these terminals. When the pressure is released by her hand leaving the plug, the ringing-springs will break contact with 33 and 35 and throw 21 back to normal position. It will thus be seen that only one motion is necessary for completing the connection after the call is received and ringing the called subscriber.

Simple relays are desirable in the operation of the system; but such devices, being well known, are not specially illustrated. Two are shown, as K and K', in Fig. 26.

Having briefly described the essential elements of the system, I will now specify the operation collectively of same and then refer to accessory parts shown in the figures.

Referring to Fig. 26, S' and S² will represent subscribers' stations; 100 and 101, subscribers' lines (shown in metallic circuit) to the central office. The balance of the apparatus illustrated in this figure will be at the central office, that to the right being upon the answering-switchboard and that to the left upon the connecting-switchboard. K K' are relays of any well-known type, but with low-wound coils. B B' are the selective devices, as already described, represented only sufficiently to demonstrate the circuits. L' and L² are the answering-jacks; R' and R², the connecting-jacks; N', a simple transfer-jack, and O' an answering-jack on a transfer-circuit. M is a listening or answering plug, and N a transfer-plug. M' is a listening-plug for the transfer, and P a ringing or connecting plug. Q and Q' represent any well-known visual signals. T and T' are operators' telephones. U is a generator for ringing-current.

At each subscriber's station the circuit, when the instrument is not in use, will be through the high-wound ringer-coils $b$ $c$. Tracing from station S' over metallic circuit 101, we find the same connected with the line-terminals of jack L², and these with the contact-springs on same jack. One contact-spring is connected by conductor 108 with the terminal piece $v'$ on the selective device and the other is connected by conductor 104 with the terminal on a connecting-jack R². From thence the circuit passes through the contact-spring of R², the common return-conductor 105, the main battery W, and the relay-coils 115 to the terminal ring $w$. This circuit will then be open between $v'$ and $w$ on the answering-board except when the contact-maker $g$ in revolving passes over $v'$, when the circuit will be closed. The resistance of the relay-coils and the strength of battery W are so gaged, however, that the relay will not be actuated while such a high resistance as that of the ringing-coils at the subscriber's station is in circuit, and the contact-maker may continually make the connection between $v'$ and $w$ without affecting the relay. If, however, subscriber at station S' wishes to call, he lifts the hand-telephone from the hook $s$ $w$, and the circuit at his station will then be practically as shown for station S², a shunt-circuit of little resistance being formed by the released hook and the contact-point $y$ $c$. This being the case, when the contact-maker $g$ next crosses $v'$ and $w$ the relay will be actuated, the local circuit through the stop-magnet coils $a$ $a$ $a$ $a$, conductors 109 and 110, and battery $x$ closed by the lever 116 of the relay coming against contact-point 117, and the motion of the wheel $f$, (see Figs. 3 and 9,) carrying the contact-maker $g$, instantly arrested. If subscriber at S' has telephone-number "27," this number will then show through the aperture F (see Figs. 1 and 2) for the following reasons: The signal-wheel A will move in synchronism with the wheel $f$ of the selective device. The figure "27" on the face of wheel A is placed in such a position thereon that it will appear at the aperture F at the same time that the contact-maker $g$ is in contact with the terminal $v'$, to which one side of the circuit from telephone-number "27" is connected. It is obvious that the number "27" will appear at the aperture F during each revolution of the signal-wheel when $g$ comes in contact with the terminal $v'$, to which telephone-line "27" is connected; but no notice will be taken of this number by the operator unless it is stopped at the aperture, and it will only stop there when subscriber No. 27 calls in the manner just described. All the other numbers upon the wheel A are arranged similarly with relation to the corresponding terminals on plate $e$, and the action will be the same for each subscriber calling. Inasmuch as $g$ can cross but one of the terminals $v$ $v'$ at a time with the ring $w$, it is also obvious that but one call can be received at a time and no interference can take place. The principle upon which this non-interfering selective device is operated is more fully elaborated in my Patent No. 536,210. In the design as now applied I have, however, dispensed with the recording device in favor of a visual signal and have for purposes hereinbefore described used a special visual-signal wheel geared to the selective device proper.

In Fig. 26 the instrument of subscriber S² is shown in position for calling, and we will presume that the operation just described has taken place at the central office. The operator being signaled, she immediately inserts plug M in jack L', thereby breaking contact in the jack between the line-terminals and the contact-springs, with the result that the circuit through the relay K is broken, its lever 116 released, local circuit through the stop-magnets $a$ $a$ $a$ $a$ broken at 117, and the motion of the wheel $f$, and consequently the signal-wheel A, continued until the contact-maker $g$ shall cross another terminal, the line connected with which shall be that of another subscriber who has called. The number of the subscriber calling will ordinarily remain exposed at aperture F until the operator inserts the plug in the right jack to answer. While inserting plug M the operator will press forward the shoulders on same, and thus bring her telephone-circuit in connection with the subscriber. She will then say "Letter," and the subscriber will respond by giving the letter preceding the number he desires—say "A." Operator will then insert the plug N in the jack N' of a trunk-line going to the "A" connecting-board and ending thereon in jack O'. The circuit will then be continued (the operator having released her hold of plug M, and thus cut off her telephone-circuit) through plugs M and N, the cord-circuit 124 connecting same, jack N', trunk-circuit 106 and 106', terminal pieces and contact-springs of jack O', conductors 111 and 112, battery W', and coils 118 of relay K', and will be open between terminal $v^2$ and ring $w'$ of selective device B'. When contact-maker $g'$ closes the circuit at $v^2$, the relay K' will be actuated and precisely the same action take place as described for receiving the signal originally at selective device B. The number displayed on the connecting-board, however, will be that of the trunk-line over which the call came—say "3." Connecting operator will then, seeing a number stationary, insert listening-plug M' in jack O' of trunk-number "3," and the process of receiving the call will be the same as that with plug M on the answering-board, except that the operator will say "Number?" and the subscriber will give the number of the party he wanted—say "76," the full designation in the list of subscribers being "A 76." The operator will then insert ringing-plug P in jack $R^2$, thus completing the connection, and by pressing forward on the shoulders of the plug the current from generator U will be thrown on the called-subscriber's line and ring his signal-bell, such current being, however, cut off when the operator removes her hand from plug P. From plug M' the circuit can then be traced through cord-circuit 125, plug P, terminals of spring-jack $R^2$, conductors 104 and 104', contact-springs and line-terminals of jack $L^2$, subscriber's-line circuit 101, and the hand-telephone and ringer-coil circuits of the called-subscriber's telephone, supposing it to be that shown upon Fig. 26 as S'. Both selective devices will be cut out by the lifting of the contact-springs on jacks L' and O' by the insertion of plugs M and M'. In the cord-circuit 124 a local battery Y and visual battery-signal Q will be included, and likewise cord-circuit 125 will include battery Y' and signal Q', these two signals showing that the connection is made and consisting of any well-known low-wound device for this purpose. When one or both of the subscribers, having finished conversation, hangs up his telephone, the high-resistance ringer-coils are brought into the circuit and batteries Y and Y', with signals Q and Q', being only operative upon a reasonably low resistance, Q and Q' will be restored to normal, and thus indicate the fact that disconnection is wanted to both operators. Either operator can listen on the circuit at any time by simply pressing upon the shoulders of plugs M or M', and the subscriber can call the attention of the central office at any time during a connection by pulling down the hand-telephone hook and releasing same, thus vibrating signals Q and Q'. Naturally the connecting operator will answer such calls, the answering operator paying attention to signal Q only when it is restored to rest in normal position, showing that disconnection is to be made. It will thus be seen that as the answering-operator's duties are simple she can answer a large number of lines promptly, a point of great advantage in a large exchange, and as she has but few different calls to distinguish she will rarely make an error, and that the responsibility for properly attending to the subscriber's wants rests almost entirely with the connecting operator, so that mistakes are readily and quite accurately located.

At C O in Fig. 26 is the chief operator's station, at which, in addition to equivalents to the usual equipment, (not shown,) she will have keys for controlling the selective devices in case of disarrangement. Two of these keys $r k$ and $l k$ are shown in connection with selective devices B and B'. They are simply devices for opening the circuits of the stop-magnets if a line should become affected, so as to hold a signal displayed beyond the control of the operators, such a possibility, however, being very remote. In case a subscriber's line is out of order outside of the exchange, so as to cause this result, the operator can start the signal-wheel and cut such line out of circuit by simply inserting a plug in the answering-jack. The defective line is then to be disconnected at the terminal board, which will now be described.

Referring to Figs. 4, 5, and 6, $a\,a$ and $b\,b$ are strips of insulating material held at each end by a key $f\,f$ turning in an oblong socket $g\,g$, with a block $i\,i$ between, so as to be parallel. The terminal strips $c\,c$ and $d\,d$ are mounted in rows upon $b\,b$ and $a\,a$, respectively, and held by rivets or screws $e\,e$, $d\,d$ being curved so as to spring against the lower terminals $c\,c$ at one end. The wires from the terminals $v$ on the selective device are connected to $d\,d$, and the subscriber's lines go to $c\,c$ after passing through the spring-jacks, (the position of the terminal board in the circuits being indicated at $T^e$ in Fig. 26,) preferably being soldered to the outside ends of the screws or rivets $e\,e$. The subscriber's line will thus normally be connected to the selective device through the contact of spring $d\,d$ upon $c\,c$, which contact can be broken by the insertion of a flat insulating-plug at any time. Any line can then be disconnected at will. If it is desired to disconnect the whole series of lines running to a particular selective device, the keys $f\,f$ are turned and withdrawn, and the strips $a\,a$ and $b\,b$ can then be separated each with its complement of terminals. The selective device B can be withdrawn from its base C, at the same time ungearing it from the signal-wheel A and slipping the belt J and a new selective device then replace it, the terminals connected with same and fastened to its plate $a\,a$ being again keyed to contact with the line-terminals on plate $b\,b$. This can be done rapidly and without disarranging other parts of the apparatus. In the actual operation of an exchange with this system one or more extra selective devices will be kept in reserve for emergencies, and at night, when the business is light, all the devices can be changed consecutively and examined or cleaned. In setting the selective device care will be taken to see that the mark $l\ l'$ on signal-wheel A (see Fig. 3) forms a straight continuous line with a similar mark $l\ l$ upon wheel $f$ of the selective device, and with this precaution all the selective devices are interchangeable. In Figs. 9 and 10 the two devices are shown in about the relative position a pair will occupy, and to be removed they will be drawn away from each other.

In Fig. 7 the relative arrangements of the answering and connecting boards are shown diagrammatically, A B' and A B² being answering-boards and C B', C B², C B³, and C B⁴ connecting-boards. Subscribers' stations S', S², S³, and S⁴ are shown with circuits to jacks L', L², L³, and L⁴ upon the answering-boards and to jacks R', R², R³, and R⁴ upon the connecting-boards. Trunk-lines connect jacks N', N², N³, N⁴, N⁵, N⁶, N⁷, and N⁸ on the answering-boards to jacks O', O², O³, O⁴, O⁵, O⁶, O⁷, and O⁸ on the connecting-boards, and are arranged so that each answering-board shall have connection with every connecting-board. As no connections are made upon the answering-boards no busy or test signals are necessary in working this system upon the divided-board plan.

I make no special claim for specific construction of the subscribers'-station apparatus, but only in combination with the central-office apparatus and circuits and the arrangement of the circuit thereof. Consequently no further diagram than that shown in Fig. 26 is made of this part of the system.

I do not limit myself to the application of the apparatus or any part thereof herein shown or described to a divided-board system nor to the same construction of apparatus as that shown, but intend to include within my claims every application of the devices shown to any character of switching or electrical signaling arrangement and every device and contrivance whatsoever substantially equivalent in this art to the several structures or the constituent elements or relative arrangements thereof herein claimed.

I claim—

1. In a telephone-exchange system a plurality of line-circuits, a central signal-receiving apparatus common to said circuits, and a plurality of sets of subscribers' apparatus, one for each line-circuit, each set comprising a telephone-transmitter and its local battery, a telephone-receiver, an induction-coil, a signal-receiving device and a switch, said switch being operative to shunt the line-circuit around the coils of the signal-receiving device and bring said local battery into the transmitter-circuit; combined substantially as described.

2. In a telephone-exchange system several transmitting devices, line-circuits for each, normally open, and a receiving device common to the several transmitting devices and combined with a selective device controlling the signals from said transmitting devices, combined substantially as described.

3. In a telephone-exchange system the combination with several series of substation-circuits of a common answering-switchboard, through which all said circuits pass, with individual spring-jack connections thereon, and signal-receiving apparatus, one set for each series of circuits; several connecting-switchboards, one for each series of substation-circuits, with spring-jack connections thereon, one for each individual circuit of the series converging thereto; and trunk-lines, with signaling apparatus connected therewith, converging from each connecting-board to the answering-board, substantially as described.

4. In a telephone-exchange system a plurality of substation-circuits, each connected at a central office or switching-station with an answering-jack, each answering-jack being connected to a connecting-jack and to a contact-plate upon a signal selecting and exhibiting device common to a number of circuits, combined substantially as described.

5. In a telephone-exchange system a listening-in device comprising shoulder-pieces on the plug, having sliding contact with the cord-circuit, a spring to restore said shoulder-pieces to normal position, an insulating-ring to limit the insertion of the plug, and contact-bars, connected with the operator's telephone-circuit, in operative relation with said shoulder-pieces and common to a plurality of spring-jacks, combined substantially as described.

6. In a telephone-exchange system, an answering-jack, a substation-line terminating at contact-plates upon same, a connecting-jack with a local line terminating at contact-plates upon same and at connecting-springs upon the answering-jack, and a local circuit for receiving signals connected to a connecting-spring upon the answering-jack and a corresponding spring upon the connecting-jack, combined substantially as described.

7. A strip of spring-jacks comprising an anterior insulating-block, longitudinal sections of metal tubes set two in each of a series of circular holes in said anterior block, a posterior insulating-block with terminal springs set therein resting in contact one with each of projecting ends of the tube-sections, and securing-strips to hold the two insulating-blocks rigidly in position, combined substantially as described.

8. In a telephone-exchange system a plurality of subscribers' line-circuits, each connected at a substation, with suitable telephone receiver, transmitter, signal-bell and signaling-switch, a plurality of answering-jacks and connecting-jacks, one of each for each of said line-circuits, several relays, each common to a proportional and plural number of said line-circuits and connected therewith intermittently through an automatic contact-making device, and several signal-display devices, one for each of said relays and controlled thereby, combined with switching-cords, plugs and operator's telephone outfits, substantially as described.

9. In a telephone-exchange system a switchboard, with a plurality of subscribers' circuits and spring-jacks connected therewith, and a signal-receiving device, common to said circuits and comprising a signal-display wheel, a signal-selective device geared to said wheel and normally in motion, an electromagnetic stop device for said selective device, and an aperture in said switchboard through which to display a signal, combined substantially as described.

10. In a telephone-exchange system a spring-jack, a plug and its cord-circuit; a signal-receiving device comprising a selective wheel, normally in motion, an electromagnetic stop device, and a signal-display wheel geared to said selective wheel; a subscriber's circuit, normally open, and signaling device comprising a switch to close a short-circuit shunt around high-resistance coils; and a source of electrical energy, operative to stop said selective wheel when said shunt is in circuit; and said plug and spring-jack in conjunction being operative to release said selective wheel; combined substantially as described.

11. In a telephone-exchange system a revolving signal-receiving device, a spring-jack, plug, and normally open substation circuit, and apparatus; said substation circuit and apparatus being operative to arrest the motion of said receiving device when a signal is transmitted, and said spring-jack and plug in conjunction being operative to release said receiving device, combined substantially as described.

12. In a telephone-exchange system a plurality of normally open substation circuits, and apparatus, a signal-receiving device, common to said circuits, and normally in motion, an electromagnetic stop device, a relay controlling said stop device, and a plurality of spring-jacks, plugs and their circuits; said substation circuits and apparatus being operative to actuate said relay and through it and said stop device to arrest the motion of said receiving device, and said spring-jacks and plugs in conjunction being operative to release said relay; combined substantially as described.

13. A plug comprising an insulating-stem with cord-terminals mounted thereon, an insulating shell or cover capable of a limited longitudinal movement upon said stem, shoulder-pieces mounted on said cover with forward-curved impinging surfaces, and stop piece, or pieces, to limit the insertion of the plug in a spring-jack, combined with coöperating terminals from a generator-circuit substantially as described.

14. The combination of a spring-jack comprising line-terminals, and conducting-strips in close proximity thereto connected with the operator's telephone-circuit, and a plug comprising core-terminals and a movable contact-maker operative to make connection between said cord-terminals and said conducting-strips.

15. In a telephone-exchange system, an answering-switchboard and a connecting-switchboard, with trunk-lines between and circuits from substations connected with each, the answering-board comprising signal-receiving apparatus, jacks with terminals from the operator's telephone-circuit in close proximity thereto, plugs with cords attached and switches thereon, operative to connect the line-circuit with the operator's telephone-circuit, and trunk-line plugs and cord-circuits; and the connecting-board comprising similar apparatus to that on the answering-board and also jacks, with terminals from a generator-circuit in proximity thereto, and plugs with cords attached thereto and switches thereon operative to connect the line-circuit with a generator-circuit; combined substantially as described.

16. A telephone subscriber's circuit comprising a normally open line, ringer-coils, a switch to shunt said coils, an answering-jack, a connecting-jack, trunk-line jacks, plugs and cords for connecting said jacks, and a signal-selective device operative to intermittently close said line, combined substantially as described.

17. In a telephone-exchange system a switchboard comprising spring-jacks, cords and plugs for connections, listening-in switches upon special answering-plugs, ringing-switches upon special connecting-plugs, an operator's telephone-circuit and an annunciator device comprising a signal-selective device, a signal-display wheel and a face-plate upon the switchboard with an aperture for the reading upon the display-wheel of each of a series of characters successively displayed at one point, combined substantially as described.

18. In a telephone-exchange system an answering-switchboard, comprising answering-jacks and switching apparatus; a plurality of connecting-boards, comprising connecting-jacks and switching apparatus; a plurality of substation-lines terminating upon said connecting-jacks and connected with said answering-jacks; a series of contact-plates with local lines connecting same to said answering-jacks; a contact-ring, relay and battery, connected by a local line to a series of connecting-jacks; a contact-maker connecting each of said contact-plates intermittently with said contact-ring; and a locking device controlling said contact-maker and controlled by said relay; combined substantially as described.

19. In a telephone-exchange system several subscribers' circuits connected to line-terminals in a terminal board, a set of switchboard-terminals separably connected with said line-terminals upon said terminal board, circuits from said switchboard-terminals to answering-jacks, circuits from said answering-jacks to connecting-jacks, conductors from said answering-jacks to an annunciator device, common to the several subscribers' circuits, and a common conductor from said connecting-jacks to complete the annunciator-circuit, combined substantially as described.

20. In a telephone-exchange system a plurality of terminal boards, or intermediate connecting-boards, for connecting subscribers' line-circuits to the switching and annunciator apparatus, each comprising a series of line-terminals to which are connected a series of subscribers' lines, and a series of switchboard-terminals to which are connected the circuits of a corresponding series of switching devices; each series of terminals being held in juxtaposition by a locking device, and each series of switchboard-terminals being interchangeable with any other such series in the number of terminal boards for the purpose of connecting any series of subscribers' lines with any series of switching devices; combined substantially as described.

21. In a telephone-exchange system a plurality of answering-jacks with answering-plugs to connect with same, and a plurality of local circuits connecting said jacks with a signal-selective device common to all, each such circuit being intermittently connected through a relay common to all and operative to actuate the signal device, combined substantially as described.

22. In a telephone-exchange system a plurality of answering-jacks, a plurality of answering-plugs, a plurality of subscribers' circuits normally open, and a selective signaling device common to and controlled by said subscribers' circuits for signaling; each answering-jack, when a signal has been transmitted over the subscriber's circuit connected therewith, and an answering-plug in conjunction being operative to restore said signaling device to normal condition to receive another signal; combined substantially as described.

In testimony whereof I have hereunto subscribed my name this 11th day of January, A. D. 1896.

WILLIAM E. M. JACKSON.

Witnesses:
HENRY O. JACKSON,
SUE BELLE MEAD.